Dec. 7, 1943.  C. J. DILLON  2,336,167
TRANSMISSION DEVICE
Filed March 18, 1942  2 Sheets-Sheet 1
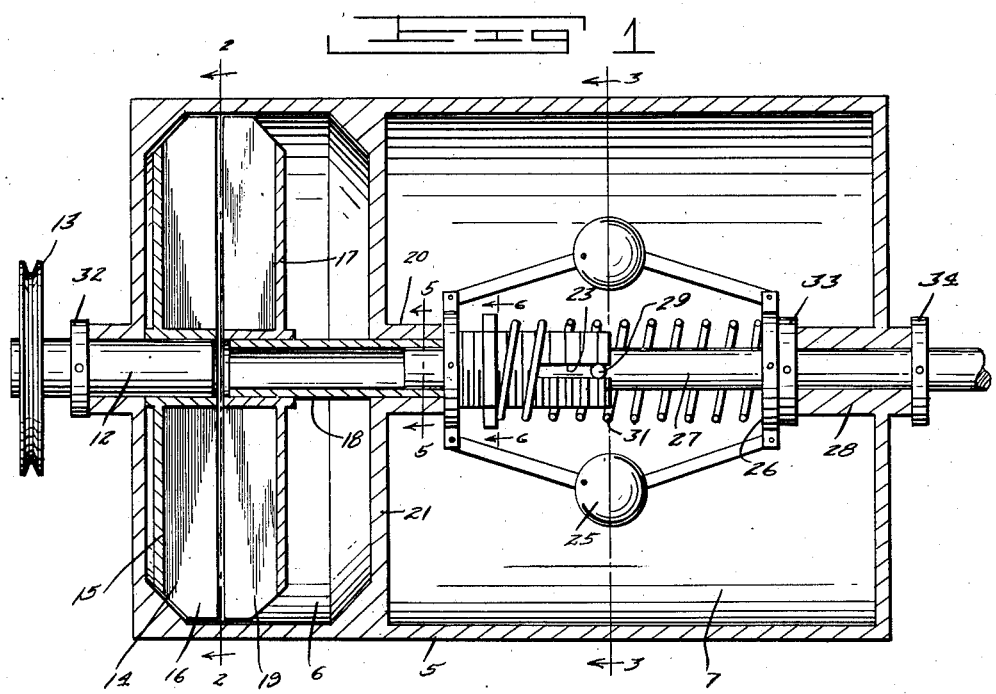
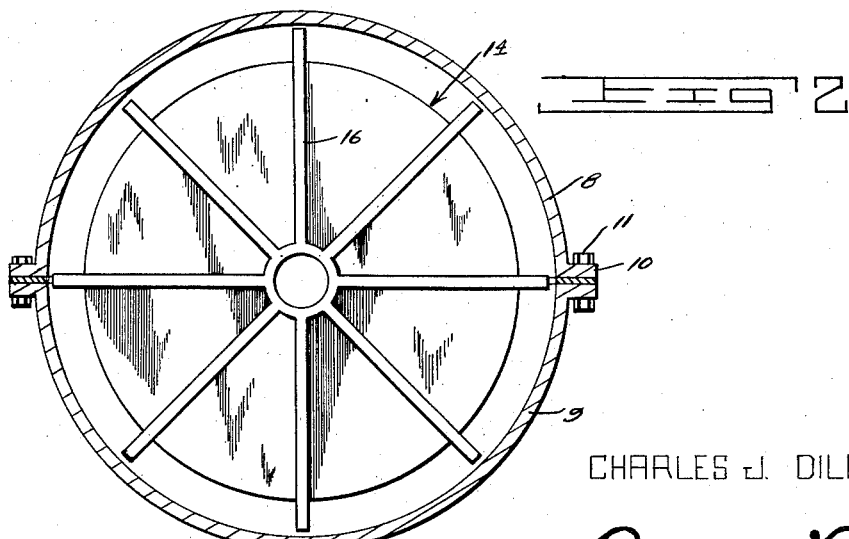
Inventor
CHARLES J. DILLON
By Clarence A. O'Brien
and Harvey B. Jacobson
Attorneys Dec. 7, 1943.  C. J. DILLON  2,336,167
TRANSMISSION DEVICE
Filed March 18, 1942  2 Sheets-Sheet 2
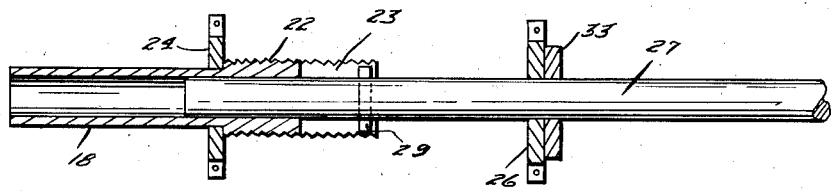
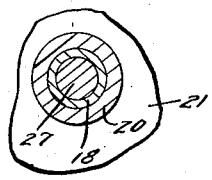 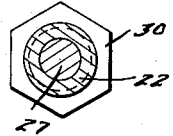
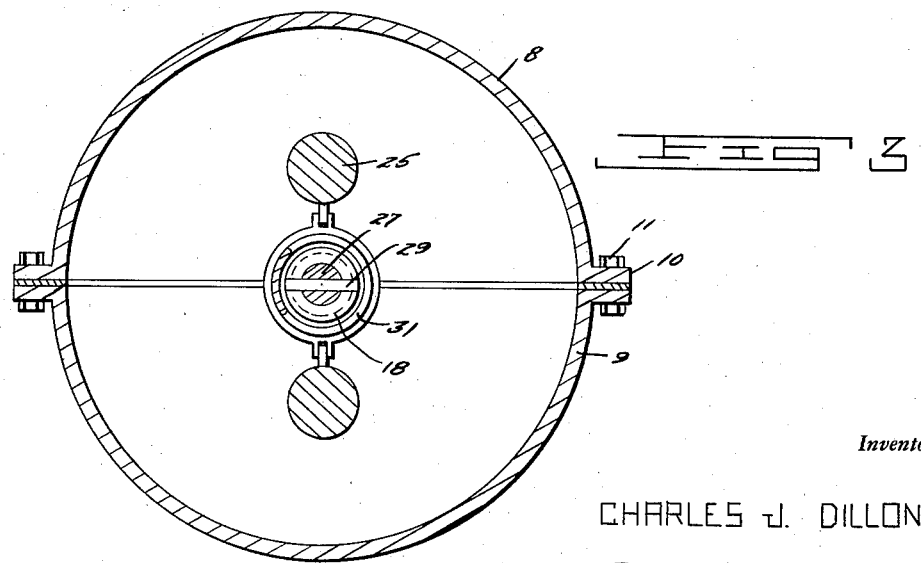
Inventor
CHARLES J. DILLON
By *Clarence A. O'Brien and Harvey B. Jacobson*
Attorneys Patented Dec. 7, 1943

2,336,167

UNITED STATES PATENT OFFICE 2,336,167

TRANSMISSION DEVICE

Charles J. Dillon, New York, N. Y.

Application March 18, 1942, Serial No. 435,241

1 Claim. (Cl. 60—54)

The present invention relates to new and useful improvements in power transmission devices designed to provide approximately constant rotary speed at output shafts regardless of the speed of the input shaft above a predetermined R. P. M.

A further object is to provide an automatically adjustable power transmission device of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a longitudinal sectional view through the housing of the transmission.

Figure 2 is a transverse sectional view taken substantially on a line 2—2 of Figure 1.

Figure 3 is a similar view taken substantially on a line 3—3 of Figure 1.

Figure 4 is a longitudinal sectional view of the sectional output shaft.

Figure 5 is a transverse sectional view taken substantially on a line 5—5 of Figure 1, and Figure 6 is a similar view taken substantially on a line 6—6 of Figure 1.

Referring now to the drawings in detail, wherein for the purpose of illustration I have disclosed a preferred embodiment of the invention, the numeral 5 designates the transmission casing having a liquid-tight clutch chamber 6 formed in one end thereof and a governor chamber 7 formed in the opposite end thereof, the casing being of cylindrical form and composed of longitudinally split sections 8 and 9 having flanges 10 at the edges thereof connected by means of bolts 11.

A drive shaft 12 is journaled in one end of the casing adjacent the chamber 6 with the outer end of the shaft provided with a drive pulley 13 driven from a suitable source of power and secured on the inner end of the shaft 12 within the chamber 6 is a clutch member 14 composed of a disk 15 having a plurality of blades 16 projecting radially on one face thereof.

A second clutch member 17 of identical construction to the clutch member 14, is secured to a tubular shaft section 18 with the blades 19 of the clutch member 17 in opposed relation with respect to the blades 16 of the clutch member 14.

The shaft section 18 is journaled in a bearing 20 in the partition 21 separating the chambers 6 and 7, the end of the shaft section disposed in the chamber 7 being externally threaded as shown at 22 and provided with a longitudinally extending slot 23 extending transversely through the shaft.

Secured on the shaft section 18 is a collar 24 forming one end of a conventional form of governor, indicated generally at 25, the governor including a collar 26 at its opposite end secured to a driven shaft 27 having one end slidably mounted in the tubular shaft section 18. The shaft 27 is journaled in a bearing 28 formed in the end wall of the casing opposite from the pulley 13.

A pin 29 extends transversely of the shaft 27 and is slidably engaged in the slot 23 of the shaft section 18.

A nut 30 is threaded on the shaft section 18 for adjustable engagement with one end of a coil spring 31 positioned between the nut and the collar 26 of the governor.

A collar 32 is secured to the shaft 12 and collars 33 and 34 are also secured to the shaft 27 to prevent end thrust of the respective shafts.

The chamber 6 is adapted to contain a quantity of liquid and upon rotation of the clutch member 14, power will be transmitted to the clutch member 17, as will be apparent.

Rotation of the shaft section 18 and shaft 27 will cause actuation of the governor 25 resulting in axial movement of the shaft section 18 and adjusting the position of the clutch member 17 relative to the clutch member 14 whereby to regulate the speed of the driven shaft 27.

It is believed the details of construction and manner of use of the device will be readily understood from the foregoing without further detailed explanation.

Having thus described the invention what I claim is:

A power transmission device comprising a casing having a drive shaft journaled in one end and a driven shaft journaled in its opposite end, said casing having a liquid-tight chamber therein, a hydraulic clutch element in the chamber and secured to the drive shaft, a tubular shaft section slidably sleeved on the driven shaft, said shaft section having a slot therein, a pin carried by the driven shaft and engaged in the slot to rotatably connect the shaft section and driven shaft, a second hydraulic clutch element in the chamber and secured to the said shaft section for moving the second clutch element relative to the first clutch element, spring means urging the clutch elements toward each other, a nut threaded on the tubular shaft for adjusting the tension of said spring means and a governor connected to the driven shaft and to the tubular shaft section for moving said second clutch element away from the first clutch element upon a predetermined rotary speed of the driven shaft.

CHARLES J. DILLON.